(12) United States Patent
Jo et al.

(10) Patent No.: US 12,040,483 B2
(45) Date of Patent: Jul. 16, 2024

(54) MULTILAYER ELECTRODE AND LITHIUM SECONDARY BATTERY INCLUDING THE SAME

(71) Applicant: SK Innovation Co., Ltd., Seoul (KR)

(72) Inventors: Byoung Wook Jo, Daejeon (KR); Jae Kyu Jin, Daejeon (KR); Dong Hoon Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 88 days.

(21) Appl. No.: 17/534,330

(22) Filed: Nov. 23, 2021

(65) Prior Publication Data

US 2022/0085360 A1 Mar. 17, 2022

Related U.S. Application Data

(63) Continuation of application No. 16/572,180, filed on Sep. 16, 2019, now Pat. No. 11,557,755.

(30) Foreign Application Priority Data

Sep. 13, 2018 (KR) .................. 10-2018-0109623

(51) Int. Cl.
*H01M 4/62* (2006.01)
*H01M 4/36* (2006.01)
(Continued)

(52) U.S. Cl.
CPC ........... *H01M 4/366* (2013.01); *H01M 4/625* (2013.01); *H01M 10/0525* (2013.01); *H01M 2004/021* (2013.01); *H01M 2004/027* (2013.01)

(58) Field of Classification Search
CPC ........... H01M 4/366; H01M 2004/021; H01M 10/052; H01M 10/0525
See application file for complete search history.

(56) References Cited

U.S. PATENT DOCUMENTS

2005/0241137 A1* 11/2005 Suzuki ................. H01M 4/70
204/290.01
2012/0328942 A1* 12/2012 Thomas-Alyea ..... H01M 4/587
429/211
(Continued)

FOREIGN PATENT DOCUMENTS

CN 107534125 A 1/2018
EP 2819221 A1 12/2014
(Continued)

OTHER PUBLICATIONS

Search Report issued by the European Patent Office Jan. 29, 2020.
(Continued)

*Primary Examiner* — Jeremiah R Smith
(74) *Attorney, Agent, or Firm* — IP & T GROUP LLP

(57) ABSTRACT

A multilayer electrode includes a current collector, a first electrode mixture layer disposed on at least one surface of the current collector, and a second electrode mixture layer disposed on the first electrode mixture layer. The first and second electrode mixture layers include one or more types of conductive materials. A porosity of the conductive material contained in the second electrode mixture layer is greater than that of the conductive material contained in the first electrode mixture layer. Ion mobility to the inside of an electrode may be improved while maintaining electrical conductivity, by including a conductive material having a relatively great average particle diameter and pores in the conductive material itself. Output characteristics of a lithium secondary battery and charging and discharging performance may be improved.

14 Claims, 3 Drawing Sheets

(51) Int. Cl.
H01M 10/0525 (2010.01)
H01M 4/02 (2006.01)

(56) References Cited

U.S. PATENT DOCUMENTS

| | | | |
|---|---|---|---|
| 2015/0010784 A1 | 1/2015 | Takahata et al. | |
| 2015/0030931 A1* | 1/2015 | Takahata | H01M 4/133 |
| | | | 427/547 |
| 2018/0097255 A1 | 4/2018 | Jung et al. | |
| 2018/0108938 A1* | 4/2018 | Iguchi | H01M 4/366 |
| 2018/0123124 A1* | 5/2018 | Yang | H01M 4/621 |

FOREIGN PATENT DOCUMENTS

| KR | 10-2014-0127883 A | 11/2014 | |
|---|---|---|---|
| KR | 10-2015-0014397 A | 2/2015 | |
| KR | 10-2016-0118586 A | 10/2016 | |
| KR | 10-2016-0122380 A | 10/2016 | |
| KR | 10-2017-0039976 A | 4/2017 | |
| KR | 2017039976 | * 4/2017 | H01M 10/052 |
| KR | 10-2017-0055637 A | 5/2017 | |
| WO | 2016/175560 A1 | 11/2016 | |

OTHER PUBLICATIONS

Office Action issued by the USPTO on Feb. 22, 2022.
Office Action for the U.S. Appl. No. 17/534,330 issued by the USPTO on Apr. 21, 2023.
A Basic Guide to Particle Characterization, Inform White Paper, May 2, 2012, pp. 1-26, Malvern Instruments Worldwide.
Office Action for the Korean Patent Application No. 10-2018-0109623 issued by the Korean Intellectual Property Office on Apr. 3, 2023.
Office Action for the Chinese Patent Application No. 201910864864.0 issued by the Chinese Patent Office on Jun. 19, 2023.
Extended European Search Report for the European Patent Application No. 23154762.1 issued by the European Patent Office on Jun. 2, 2023.

* cited by examiner

MULTILAYER ELECTRODE AND LITHIUM SECONDARY BATTERY INCLUDING THE SAME

CROSS-REFERENCE TO RELATED APPLICATION(S)

This application is a continuation of U.S. patent application Ser. No. 16/572,180 filed on Sep. 16, 2019, which claims the benefit under 35 USC 119(a) of Korean Patent Application No. 10-2018-0109623 filed on Sep. 13, 2018 in the Korean Intellectual Property Office, the entire disclosure of which is incorporated herein by reference for all purposes.

BACKGROUND

The present disclosure relates to a multilayer electrode and a lithium secondary battery including the same, and more particularly, to a multilayer electrode comprised of a plurality of electrode mixture layers including a conductive material having different average particle diameters and porosity, and a lithium secondary battery including the same.

As technological development and demand for mobile devices have increased, there has been a rapid increase in demand for secondary batteries as energy sources. Among such secondary batteries, lithium secondary batteries, exhibiting high energy density and operating potential and which have a long cycle life and a low self-discharge rate, have been commercialized and widely used.

As interest in environmental issues has increased in recent years, research into electric vehicles (EVs) and hybrid electric vehicles (HEVs), which may replace fossil-fueled vehicles such as gasoline vehicles, diesel vehicles and the like, significant causes of air pollution, has been conducted. Lithium secondary batteries having high energy density, high discharge voltage and output stability have mainly been researched and used as power sources for electric vehicles (EVs) and hybrid electric vehicles (HEVs).

Such a lithium secondary battery is under development as a model capable of implementing a high voltage and a high capacity in line with consumer demand. To implement a high capacity thereof, a lithium secondary battery is required to have an optimization process of a cathode material, an anode material, a separator, and an electrolyte, four elements of the lithium secondary battery, within a limited space.

Generally, an electrode for a secondary battery is produced by preparing a slurry in which an active material and a binder, and as required, a conductive material, are mixed, and then applying the slurry to a collector, such as a copper foil, as a single layer, followed by drying. In this case, at the time of applying the slurry, an active material powder is pressed onto a current collector and a pressing process is performed to uniformize the thickness of an electrode.

However, in the calendeing process of the related art, the surface pressing of an active material is increased as compared with the inside of the active material, and a pore ratio of the surface is reduced. This phenomenon becomes more severe as the thickness of an electrode increases or the calendeing density increases. Thus, in this case, it becomes difficult to impregnate an electrolyte into the inside of the electrode, and an ion movement path cannot thus be secured, such that ion transfer cannot be smooth. Therefore, there is a problem in that battery performance and lifespan characteristics are deteriorated.

SUMMARY

An aspect of the present disclosure is to provide a multilayer electrode having a multilayer structure in which diffusion of ions may be facilitated by including a conductive material which has electric conductivity similar to that of a commonly used conductive material and has a relatively large average particle diameter and pores in the conductive material itself, and to provide a lithium secondary battery including the same.

According to an aspect of the present disclosure, a multilayer electrode includes a current collector, a first electrode mixture layer disposed on at least one surface of the current collector, and a second electrode mixture layer disposed on the first electrode mixture layer. The first and second electrode mixture layers include one or more types of conductive materials, and a porosity of the conductive material contained in the second electrode mixture layer is greater than a porosity of the conductive material contained in the first electrode mixture layer.

The porosity of the conductive material contained in the first electrode mixture layer may be 0 to 30%, and the porosity of the conductive material contained in the second electrode mixture layer may be 50 to 90%.

An average particle diameter of the conductive material contained in the second electrode mixture layer may be greater than an average particle diameter of the conductive material contained in the first electrode mixture layer.

The average particle diameter of the conductive material contained in the first electrode mixture layer may be 0.01 to 0.5 μm, and the average particle diameter of the conductive material contained in the second electrode mixture layer may be 0.5 to 5 μm.

An average pore diameter of the conductive material contained in the first electrode mixture layer may be 0 to 0.01 μm, and an average pore diameter of the conductive material contained in the second electrode mixture layer may be 0.01 to 0.5 μm.

The conductive material may be one or more selected from carbon black, acetylene black, furnace black, ketjen black, carbon nanotubes, artificial graphite, natural graphite, silver, aluminum and copper.

A thickness of the second electrode mixture layer may be 20 to 80% of a total thickness of the first and second electrode mixture layers.

A content of the conductive material contained in the second electrode mixture layer may be more than 0.5 wt % to less than 5 wt % of a total active material content of the first and second electrode mixture layers.

According to an aspect of the present disclosure, a multilayer electrode includes a current collector, a first electrode mixture layer disposed on at least one surface of the current collector, and a second electrode mixture layer disposed on the first electrode mixture layer. The first and second electrode mixture layers include a first conductive material and a second conductive material having a porosity greater than a porosity of the first electrode mixture layer, and a content of the second conductive material contained in the second electrode mixture layer is greater than a content of the second conductive material contained in the first electrode mixture layer.

The porosity of the conductive material contained in the first electrode mixture layer may be 0 to 30%, and the porosity of the conductive material contained in the second electrode mixture layer may be 50 to 90%.

An average particle diameter of the conductive material contained in the second electrode mixture layer may be greater than an average particle diameter of the conductive material contained in the first electrode mixture layer.

The average particle diameter of the conductive material contained in the first electrode mixture layer may be 0.01 to 0.5 µm, and the average particle diameter of the conductive material contained in the second electrode mixture layer may be 0.5 to 5 µm.

An average pore diameter of the conductive material contained in the first electrode mixture layer may be 0 to 0.01 µm, and an average pore diameter of the conductive material contained in the second electrode mixture layer may be 0.01 to 0.5 µm.

The conductive material may be one or more selected from carbon black, acetylene black, furnace black, ketjen black, carbon nanotubes, artificial graphite, natural graphite, silver, aluminum and copper.

A thickness of the second electrode mixture layer may be 20 to 80% of a total thickness of the first and second electrode mixture layers.

A content of the conductive material contained in the second electrode mixture layer may be more than 0.5 wt % to less than 5 wt % of a total active material content of the first and second electrode mixture layers.

According to an aspect of the present disclosure, a lithium secondary battery includes the multilayer electrode as described above.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
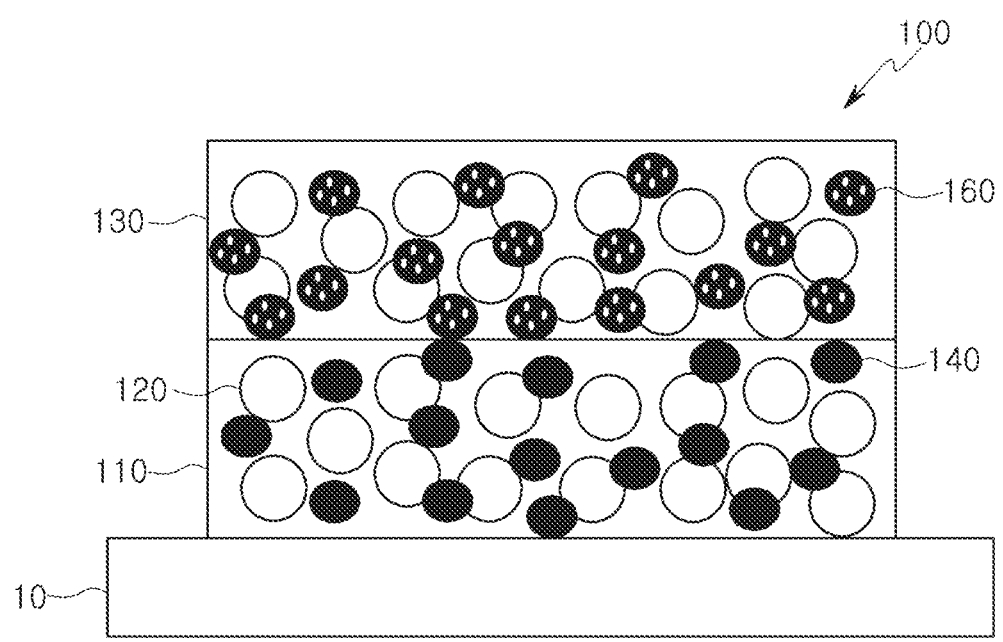
FIG. 1 schematically illustrates a multilayer electrode according to an embodiment of the present disclosure.
Figure 2:
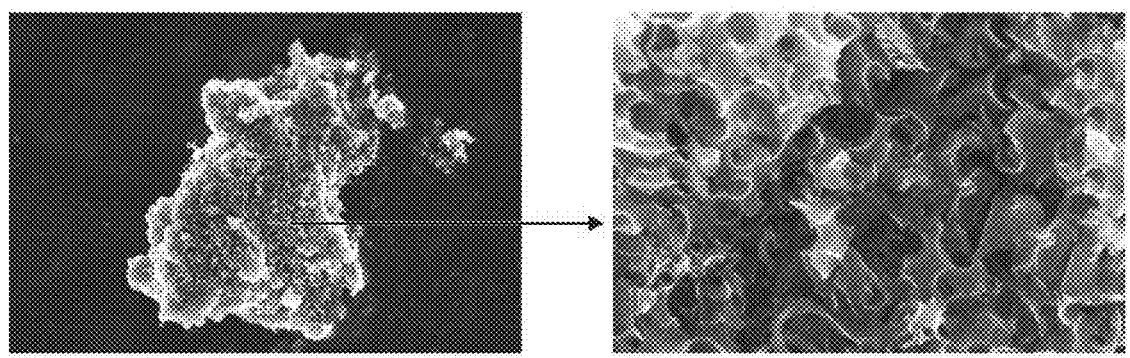
FIG. 2 is a SEM image of a second conductive material used in an embodiment of the present disclosure.
Figure 3:
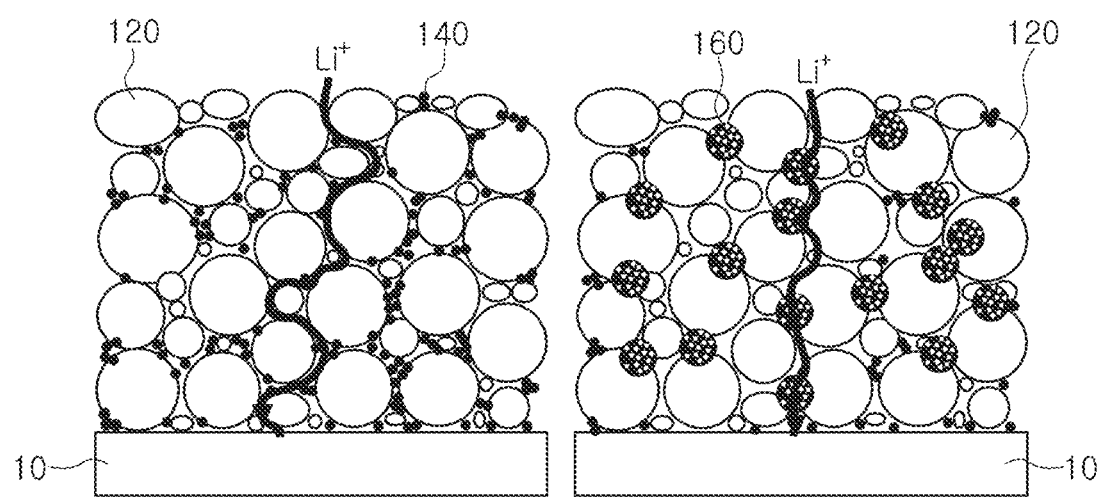
FIG. 3 is a schematic view conceptually illustrating lithium ion diffusion into an electrode mixture layer, depending on whether or not a second conductive material is added.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, embodiments of the present disclosure will be described with reference to various embodiments. However, the embodiments of the present disclosure may be modified into various other forms, and the scope of the present disclosure is not limited to the embodiments described below.

According to an embodiment, a multilayer electrode comprised of a plurality of electrode mixture layers, including conductive materials having different average particle diameters and porosity, and a lithium secondary battery including the same, are provided.

In recent years, to increase a battery energy density and reduce manufacturing costs, the thickness of an electrode has increased and the density of an electrode mixture layer has increased. However, as the thickness and density of the electrode increase, the movement of electrons and the movement of lithium ions are restricted, resulting in a problem such as performance degradation in output characteristics and a high rate of a battery.

Therefore, according to an embodiment of the present disclosure to prevent occurrence of a problem as described above, a multilayer electrode including a porous conductive material, which has an electric conductivity similar to that of a generally used conductive material and has a relatively large average particle diameter and pores in the conductive material itself, to be capable of facilitating movement of lithium ions, may be provided.

According to an embodiment of the present disclosure, a multilayer electrode includes a current collector 10, a first electrode mixture layer 110 formed on at least one surface of the current collector 10, and a second electrode mixture layer 130 formed on the first electrode mixture layer. The first and second electrode mixture layers 110 and 130 include a conductive material. In this case, the porosity of a conductive material contained in the second electrode mixture layer 130 is greater than the porosity of a conductive material contained in the first electrode mixture layer 110.

The conductive material is added to impart conductivity without causing chemical changes in a battery. However, in a case in which the conductive material content increases, the conductivity increases, but as the conductive material having a smaller average particle diameter and a lower density than those of an active material is present in a relatively large amount in the material mixture layer, the porosity of an electrode is decreased and movement distances of ions increases, based on the same mixture layer weight, a restriction on the movement of the lithium ions occurs, causing a problem such as deterioration in performance of output characteristics and a high rate of a battery.

Accordingly, in an embodiment of the present disclosure, a multilayer electrode, including the first and second electrode mixture layers sequentially stacked on a current collector, is configured in such a manner that the porosity of a conductive material contained in the second electrode mixture layer is greater than the porosity of a conductive material contained in the first electrode mixture layer, and thus, movement of lithium ions may be smooth.

In detail, the porosity of the conductive material contained in the first electrode mixture layer is 0 to 30%, and the porosity of the conductive material contained in the second electrode mixture layer may be 50 to 90%, in more detail, 60 to 80%. If the porosity of the conductive material contained in the second electrode mixture layer is less than 50%, the function thereof may be difficult to serve as a movement path of lithium ions. If the porosity of the conductive material contained in the second electrode mixture layer exceeds 90%, it is difficult to maintain the conductive material form, and thus, the conductive material may easily break during a calendeing process and the function thereof may also be difficult to serve as a movement path of lithium ions.

The shape of the conductive material is not particularly limited, but may be spherical. For smooth movement of the lithium ions as described above, an average particle diameter of the conductive material included in the second electrode mixture layer may be greater than an average particle diameter of the conductive material contained in the first electrode mixture layer.

In detail, an average particle diameter $D_{50}$ of the conductive material contained in the first electrode mixture layer is 0.01 to 0.5 μm, and an average particle diameter of the conductive material contained in the second electrode mixture layer is 0.5 to 5 μm, in more detail, 1 to 3 μm. If the average particle diameter $D_{50}$ of the conductive material contained in the second electrode mixture layer is less than 0.5 μm, since the conductive material may only fill pores between active material particles, it may be difficult to sufficiently perform the role of relatively shortening the movement path of lithium ions. If the average particle diameter $D_{50}$ of the conductive material contained in the second electrode mixture layer exceeds 0.5 μm, as a surface area of the conductive material decreases, electrical contact resistance between active material particles, as well as between active material particles and current collector particles, may increase.

An average pore diameter of the conductive material contained in the second electrode mixture layer may be greater than an average pore diameter of the conductive material contained in the first electrode mixture layer. For example, the average pore diameter of the conductive material contained in the first electrode mixture layer may be 0 to 0.01 μm, and the average pore diameter of the conductive material contained in the second electrode mixture layer may be 0.01 to 0.5 μm, in detail, 0.05 to 0.3 μm. If the average pore diameter of the conductive material contained in the second electrode mixture layer is less than 0.01 μm, the radius of the lithium ion diffusion path may be reduced, so that a diffusion rate of lithium ions through the pores of the conductive material is significantly reduced. If the average pore diameter of the conductive material contained in the second electrode mixture layer exceeds 0.5 μm, strength of a conductive material layer may be reduced and the conductive material layer may be easily cracked during a calendeing process.

Examples of the conductive material contained in the first and second electrode mixture layers in an embodiment include carbon such as carbon black, acetylene black, furnace black, ketjen black, artificial graphite, natural graphite or the like, and a metal such as silver, aluminum, copper or the like. Further, as a material of the first and second electrode mixture layers, only one kind of conductive material having different porosity and different average particle diameters may be used, or two or more conductive materials may be used in which the porosity and an average particle diameter of a plurality of conductive materials in the second electrode mixture layer may be greater than the porosity and an average particle diameter of the conductive material contained in the first electrode mixture layer.

In addition, the content of the conductive material contained in the second electrode mixture layer may be more than 0.5 wt % to less than 5 wt % of the total active material content of the electrode mixture layer. If the content of the conductive material contained in the second electrode mixture layer is 0.5 wt % or less, the formation of pores due to the conductive material in the electrode mixture layer is insufficient and the diffusion of lithium ions is difficult to improve. If the content of the conductive material contained in the second electrode mixture layer is 5 wt % or more, the formation of pores is sufficient, but contact between the active material and the conductive material is insufficient due to an increase in an average surface area of the conductive material in the electrode mixture layer, thereby lowering electric conductivity of the electrode mixture layer.

On the other hand, a thickness of the second electrode mixture layer may be 20 to 80% of the total thickness of the electrode mixture layer. If the thickness of the second electrode mixture layer is less than 20%, the effect of diffusion of lithium ions into the electrode mixture layer is insignificant, even in a case in which pores are formed due to the second conductive material. If the thickness of the second electrode mixture layer is more than 80%, formation of pores in the electrode mixture layer may be sufficient, but electric conductivity of the electrode mixture layer may be lowered due to an increase in the average surface area of the conductive material in the electrode mixture layer.

Further, according to an embodiment of the present disclosure, a multilayer electrode includes a current collector; a first electrode mixture layer formed on at least one surface of the current collector; and a second electrode mixture layer formed on the first electrode mixture layer. The first and second electrode mixture layers include a first conductive material and a second conductive material having a porosity higher than that of the first conductive material. In this case, a content of the second conductive material contained in the second electrode mixture layer is greater than a content of the second conductive material contained in the first electrode mixture layer. For example, in the first electrode mixture layer and the second electrode mixture layer, a conductive material having a relatively low porosity and a second conductive material having a relatively high porosity may be mixed with each other. In this case, the conductive material having a relatively great porosity may be contained in a relatively large amount in the second electrode mixture layer than in the first electrode mixture layer.

The porosity of the first conductive material may be 0 to 30%, and the porosity of the second conductive material may be 50 to 90%, in detail, 60 to 80%. If the porosity of the second conductive material is less than 50%, the function thereof may be difficult to serve as a movement path of lithium ions. If the porosity of the second conductive material exceeds 90%, it is difficult to maintain the conductive material form, and thus, the conductive material may easily break during a calendeing process and the function thereof may also be difficult to serve as a movement path of lithium ions.

For example, by including a relatively large amount of conductive material having a high porosity in the second electrode mixture layer, movement of lithium ions may be further smooth as described above.

The shape of the first and second conductive materials is not particularly limited, but may be spherical. For smooth movement of lithium ions, an average particle diameter of the second conductive material may be greater than an average particle diameter of the first conductive material.

In detail, the first conductive material may have an average particle diameter $D_{50}$ of 0.01 to 0.5 μm, and the second conductive material may have an average particle diameter of 0.5 to 5 μm, in detail, 1 to 3 μm. If the average particle diameter $D_{50}$ of the second conductive material is less than 0.5 μm, since the conductive material may only fill pores between active material particles, it may be difficult to sufficiently perform the role of relatively shortening the movement path of lithium ions. If the average particle diameter $D_{50}$ of the second conductive material exceeds 5 μm, there may be a problem in which electrical contact resistance between active material particles, as well as between active material particles and current collector particles, may increase.

The average pore diameter of the second conductive material may also be greater than the average pore diameter of the first conductive material. For example, the average pore diameter of the first conductive material may be 0 to 0.01 μm, and the average pore diameter of the second conductive material may be 0.01 to 0.5 μm, in detail, 0.05 to 0.3 μm. If the average pore diameter of the second conductive material is less than 0.01 μm, the radius of the lithium ion diffusion path may be reduced, such that a diffusion rate of lithium ions through pores of the conductive material is significantly reduced. If the average pore diameter of the second conductive material exceeds 0.5 μm, strength of a conductive material layer is lowered and may easily break during a calendeing process.

In this case, since the second electrode mixture layer relatively far from the current collector includes a relatively large amount of the second conductive material having a relatively great average particle diameter and high porosity, lithium ions may be smoothly moved while maintaining electrical conductivity. Further, since the average particle diameter of the second conductive material is greater than that of the first conductive material, if the second conductive material is added in the same mass as that of the first conductive material due to the effect of reduction in a surface area of a conductive material, the function of the conductive material as a medium of connecting an active material having low conductivity to the current collector is insufficient. Thus, resistance of a battery may be increased even in a case in which the electrical contact resistance increases and consequently the diffusion resistance of the lithium ion decreases. Therefore, to facilitate the diffusion of lithium ions and prevent electrical contact resistance between an active material and a current collector from being reduced, the second conductive material is distributed more in the second electrode mixture layer than in the first electrode mixture layer, only reducing a bottle-neck phenomenon in diffusion of lithium ions.

The total contents of the conductive materials included in the first and second electrode mixture layers may be the same, and in the case in which the contents of conductive materials contained in respective layers are the same, since the porosity of the second conductive material contained in the second electrode mixture layer is greater than that of the first conductive material contained in the first electrode mixture layer, charging and discharging performance at the output and the high rate of the battery may be improved.

The content of the second conductive material contained in the second electrode mixture layer may be more than 0.5 wt % to less than 5 wt % of the total active material content of the electrode mixture layer. If the content of the second conductive material is 0.5 wt % or less, the formation of pores due to the conductive material in the electrode mixture layer is insufficient and the diffusion of lithium ions is difficult to improve. If the content of the second conductive material is 5 wt % or more, formation of pores is sufficient, but there is a problem in which electric conductivity of the electrode mixture layer may be lowered due to insufficient contact between an active material and a conductive material by an increase in an average surface area of the conductive material in the electrode mixture layer.

On the other hand, a thickness of the second electrode mixture layer may be 20 to 80% of the total thickness of the electrode mixture layer. If the thickness of the second electrode mixture layer is less than 20%, the effect of diffusion of lithium ions into the electrode mixture layer is insignificant even in a case in which pores are formed due to the second conductive material. If the thickness of the second electrode mixture layer is more than 80%, pores in the electrode mixture layer are sufficiently formed, but the electric conductivity of the electrode mixture layer may be lowered due to an increase in an average surface area of the conductive material in the electrode mixture layer.

As a material of the current collector constituting the multilayer electrode according to an example, for example, stainless steel, aluminum, nickel, titanium, stainless steel surface-treated with sintered carbon, copper, carbon, nickel, titanium or silver, an aluminum-cadmium alloy, a nonconductive polymer surface-treated with a conductive material, and a conductive polymers, or the like may be used, but an example thereof is not limited thereto.

The multilayer electrode according to an embodiment may be a cathode or an anode, and in the case of a cathode, the first and second electrode mixture layers may include a cathode active material and a binder. Examples of the cathode active material include a layered compound such as lithium cobalt oxide ($LiCoO_2$), lithium nickel oxide ($LiNiO_2$) or the like, a compound substituted with 1 or more transition metals, a compound represented by the formula $Li_{1+x}Mn_{2-x}O_4$ (x is 0 to 0.33), lithium manganese oxides such as $LiMnO_3$, $LiMn_2O_3$, $LiMnO_2$, or the like, lithium copper oxide ($Li_2CuO_2$); a vanadium oxide such as $LiV_3O_8$, $LiFe_3O_4$, $V_2O_5$, $Cu_2V_2O_7$, or the like, a Ni-site type lithium nickel oxide represented by the formula $LiNi_{1-x}M_xO_2$ (where M=Co, Mn, Al, Cu, Fe, Mg, B or Ga and x=0.01 to 0.3); a lithium manganese composite oxide represented by the formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn), a lithium manganese composite oxide of a spinel structure represented by $LiNi_xMn_{2-x}O_4$, $LiMn_2O_4$ in which a portion of Li in the formula is substituted with an alkaline earth metal ion, disulfide compounds, $Fe_2(MoO_4)_3$, lithium nickel manganese cobalt composite oxide (NMC), and the like, without limitation, but the examples thereof are not limited thereto.

For example, when the multilayer electrode is an anode, examples of an anode active material may include one or more carbon-based materials selected from crystalline artificial graphite, crystalline natural graphite, amorphous hard carbon, low crystalline soft carbon, carbon black, acetylene black, Ketjen black, super P, graphene and fibrous carbon, Si-based materials, a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group 1, group 2, group 3 elements of the periodic table, halogen; 0<x=1; 1≤=y≤=3; 1≤=z≤=8), or the like, a lithium metal, a lithium alloy, a silicon-based alloy, a tin-based alloy, a metal oxide such as $SiO$, $SiO_2$, $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$, or the like, a conductive polymer such as polyacetylene or the like, Li—Co—Ni-based materials, a titanium oxide, a lithium titanium oxide, and the like.

On the other hand, a binder contained in the electrode mix layer to improve adhesion or the like is not particularly limited, but examples of the binder may include, for example, polyvinylidene fluoride (PVDF), polyvinyl alcohol, Carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butylene rubber (SBR), fluorine rubber, or styrene monomer (SM), butadiene (BD), butyl acrylate (BA), mussel protein, polyolefin binder, silane binder, and the like.

According to another embodiment, a lithium secondary battery including the multilayer electrode described above is provided. Thus, charging and discharging characteristics at the output and the high rate of a lithium secondary battery may be improved.

EMBODIMENT EXAMPLES

Hereinafter, the present disclosure will be described in more detail with reference to example embodiments. The following examples are intended to further illustrate the present disclosure and are not intended to limit the present disclosure.

Embodiment Example 1

A cathode active material (nickel cobalt manganese oxide), a first conductive material (trade name: XC-72) and a binder (polyvinylidene fluoride) were mixed to have a weight ratio of 95%, 2.5% and 2.5%, respectively, and were then mixed in an N-methylpyrrolidone (NMP) solvent to have the weight of a solid of about 65%, thereby preparing a first mixture layer slurry.

A cathode active material (nickel cobalt manganese oxide), a first conductive material (trade name: XC-72), a second conductive material (trade name: LD2N, $D_{50}$=3 μm, porosity=75%) and a binder (polyvinylidene fluoride) were mixed to have a weight ratio of 95%, 1.5%, 1.0% and 2.5%, respectively, and were then mixed in an N-methylpyrrolidone (NMP) solvent to have the weight of a solid of about 65%, thereby preparing a second mixture layer slurry.

The first cathode mixture layer slurry was applied to one surface of an aluminum foil (having a thickness of 12 μm) to a thickness of about 50 μm to form a first electrode mixture layer. Subsequently, the second cathode mixture layer slurry was applied to the first electrode mixture layer to a thickness of about 50 μm to form a second electrode mixture layer, followed by drying.

Then, the first and second electrode mixture layers were calendeed to prepare a cathode having a final thickness of 65 μm.

Embodiment Example 2

A cathode active material (nickel cobalt manganese oxide), a first conductive material (trade name: XC-72) and a binder (polyvinylidene fluoride) were mixed to have a weight ratio of 95%, 2.5% and 2.5% %, respectively, and were then mixed in an N-methylpyrrolidone (NMP) solvent to have the weight of a solid of about 65%, thereby preparing a first mixture layer slurry.

A cathode active material (nickel cobalt manganese oxide), a first conductive material (trade name: XC-72), a second conductive material (trade name: LD2N, $D_{50}$=3 μm, porosity=75%) and a binder (polyvinylidene fluoride) were mixed to have a weight ratio of 95%, 0.5%, 2.0% and 2.5%, respectively, and were then mixed in an N-methylpyrrolidone (NMP) solvent to have the weight of a solid of about 65%, thereby preparing a second mixture layer slurry.

The first cathode mixture layer slurry was applied to one surface of an aluminum foil (having a thickness of 12 μm) to a thickness of about 50 μm to form a first electrode mixture layer. Subsequently, the second cathode mixture layer slurry was applied to the first electrode mixture layer to a thickness of about 50 μm to form a second electrode mixture layer, followed by drying.

Then, the first and second electrode mixture layers were calendeed to prepare a cathode having a final thickness of 65 μm.

Comparative Example 1

A cathode active material (nickel cobalt manganese oxide), a first conductive material (trade name: XC-72) and a binder (polyvinylidene fluoride) were mixed to have a weight ratio of 95%, 2.5% and 2.5% %, respectively, and were then mixed in an N-methylpyrrolidone (NMP) solvent to have the weight of a solid of about 65%, thereby preparing a cathode slurry.

The cathode slurry was applied to one surface of an aluminum foil (having a thickness of 12 μm) to a thickness of about 100 μm to form an electrode mixture layer, followed by drying.

Then, the first and second electrode mixture layers were calendeed to prepare a cathode having a final thickness of 65 μm.

Comparative Example 2

A cathode active material (nickel cobalt manganese oxide), a first conductive material (trade name: XC-72), a second conductive material (trade name: LD2N, $D_{50}$=3 μm, porosity=75%) and a binder (polyvinylidene fluoride) were mixed to have a weight ratio of 95%, 2.0%, 0.5% and 2.5%, respectively, and were then mixed in an N-methylpyrrolidone (NMP) solvent to have the weight of a solid of about 65%, thereby preparing a cathode slurry.

The cathode slurry was applied to one surface of an aluminum foil (having a thickness of 12 μm) to a thickness of about 100 μm to form an electrode mixture layer, followed by drying.

Then, the first and second electrode mixture layers were calendeed to prepare a cathode having a final thickness of 65 μm.

Comparative Example 3

A cathode active material (nickel cobalt manganese oxide), a first conductive material (trade name: XC-72), a second conductive material (trade name: LD2N, $D_{50}$=3 μm, porosity=75%) and a binder (polyvinylidene fluoride) were mixed to have a weight ratio of 95%, 1.5%, 1.0% and 2.5%, respectively, and were then mixed in an N-methylpyrrolidone (NMP) solvent to have the weight of a solid of about 65%, thereby preparing a cathode slurry.

The cathode slurry was applied to one surface of an aluminum foil (having a thickness of 12 μm) to a thickness of about 100 μm to form an electrode mixture layer, followed by drying.

Then, the first and second electrode mixture layers were calendeed to prepare a cathode having a final thickness of 65 μm.

Comparative Example 4

A cathode active material (nickel cobalt manganese oxide), a second conductive material (trade name: LD2N, $D_{50}$=3 μm, porosity=75%) and a binder (polyvinylidene fluoride) were mixed to have a weight ratio of 94.5%, 3% and 2.5%, respectively, and were then mixed in an N-methylpyrrolidone (NMP) solvent to have the weight of a solid of about 65%, thereby preparing a cathode slurry.

The cathode slurry was applied to one surface of an aluminum foil (having a thickness of 12 μm) to a thickness of about 100 μm to form an electrode mixture layer, followed by drying.

Then, the first and second electrode mixture layers were calendeed, but a final thickness thereof was not reduced to 70 μm or less, and a subsequent process for manufacturing a cathode was stopped.

Current Collector-Active Material Contact Resistance

Contact resistance between a current collector and an active material was measured on cathode mixture layers prepared in Embodiment Examples 1 to 2 and Comparative Examples 1 to 3, and the results are illustrated in Table 1.

The contact resistance was measured by cutting a calendeed electrode into the size of about 10×10 mm, placing the cut electrode on an electrode resistance meter (Hioki), applying a current of 1.0V and a current of 0.1 mA thereto and then measuring interfacial resistance between the current collector and the active material.

1.5 C Charge and Discharge Capacity Evaluation

Lithium secondary batteries manufactured using the cathodes prepared in Embodiment Examples 1 to 2 and Comparative Examples 1 to 3 were measured for 1.5 C charge capacity and discharge capacity, and the results are illustrated in Table 1.

The battery prepared using the anode was charged and discharged three times at 0.3 C before measuring 1.5 C charge capacity and discharge capacity.

To measure 1.5 C charge capacity, the battery completed in discharging was charged until the voltage reaches 4.2V at the constant current (CC) mode of 1.5 C, and was then continuously charged until the current decreases to 0.5% of an initial value from 4.2V. In Table 1, the charged capacity was used as a value obtained by dividing the charged capacity in this process by the discharge capacity of the last cycle during the 0.3 C charging and discharging that was previously performed.

To measure the 1.5 C discharge capacity, the battery completed in charging was discharged until the voltage reached 2.5V at a constant current (CC) mode of 1.5 C. The discharge capacity in Table 1 was used as a value obtained by dividing the discharged capacity in this process by the discharge capacity of the last cycle during 0.3 C charging and discharging.

TABLE 1

| | | Comparative Example 1 | Comparative Example 2 | Comparative Example 3 | Embodiment Example 1 | Embodiment Example 2 |
|---|---|---|---|---|---|---|
| First electrode mixture layer | First conductive material weight | 2.5% | 2.0% | 1.5% | 2.5% | 2.5% |
| | Second conductive material weight | 0% | 0.5% | 1.0% | 0% | 0% |
| Second electrode mixture layer | First conductive material weight | 2.5% | 2.0% | 1.5% | 1.5% | 0.5% |
| | Second conductive material weight | 0% | 0.5% | 1.0% | 1.0% | 2.0% |
| Current collector-active material contact resistance | | 0.31 | 0.42 | 0.57 | 0.30 | 0.29 |
| DC-IR | | 1.72 | 1.64 | 1.66 | 1.62 | 1.60 |
| 1.5 C Charge capacity(/0.3 C discharge capacity) | | 74.4% | 69.9% | 76.2% | 75.8% | 77.9% |
| 1.5 C discharge capacity(/0.3 C discharge capacity) | | 48.8% | 44.6% | 53.1% | 55.1% | 58.5% |

Referring to Table 1, it can be confirmed that according to embodiments of the present disclosure, all the effects such as contact resistance, charge/discharge capacity and the like are improved.

As set forth above, according to an embodiment, ion mobility to the inside of an electrode may be improved by including a conductive material having a relatively large average particle diameter and pores in the conductive material itself, and thus, output characteristics and relatively high rate charging and discharging performance of a lithium secondary battery may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer anode comprising:
   a current collector;
   a first anode mixture layer disposed in contact with at least one surface of the current collector; and a second anode mixture layer disposed on the first anode mixture layer, wherein the first anode mixture layer includes a first active material and a first conductive material, and the second anode mixture layer includes a second anode active material and a second conductive material, wherein the first anode active material is the same as the second anode active material, wherein a porosity of the second conductive material contained in the second anode mixture layer is greater than a porosity of the first conductive material contained in the first anode mixture layer, wherein the second anode mixture layer is disposed on an outermost surface of the multilayer anode, wherein a thickness of the second anode mixture layer is 50 to 80% of a total thickness of the first and second anode mixture layers, and wherein a content of the second conductive material contained in the second anode mixture layer is more than 0.5 wt % to less than 5 wt % of a total active material content of the first and second anode mixture layers.

2. The multilayer anode of claim 1, wherein the porosity of the first conductive material contained in the first anode mixture layer is 0 to 30%, and the porosity of the second conductive material contained in the second anode mixture layer is 50 to 90%.

3. The multilayer anode of claim 1, wherein an average particle diameter of the second conductive material contained in the second anode mixture layer is greater than an average particle diameter of the first conductive material contained in the first anode mixture layer.

4. The multilayer anode of claim 3, wherein the average particle diameter of the first conductive material contained in the first anode mixture layer is 0.01 to 0.5 μm, and the average particle diameter of the second conductive material contained in the second anode mixture layer is 0.5 to 5 μm.

5. The multilayer anode of claim 3, wherein an average pore diameter of the first conductive material contained in the first anode mixture layer is 0 to 0.01 μm, and an average pore diameter of the second conductive material contained in the second anode mixture layer is 0.01 to 0.5 μm.

6. The multilayer anode of claim 1, wherein the first and second conductive materials are one or more selected from carbon black, acetylene black, furnace black, ketjen black, carbon nanotubes, artificial graphite, natural graphite, silver, aluminum and copper.

7. A multilayer anode comprising:
a current collector;
a first anode mixture layer disposed in contact with at least one surface of the current collector; and
a second anode mixture layer disposed on the first anode mixture layer, wherein the first anode mixture layer includes a first an anode active material, a first conductive material and a second conductive material, and the second anode mixture layer includes a second anode active material, the first conductive material and the second conductive material, wherein the first anode active material is the same as the second anode active material, and the second conductive material has a porosity greater than a porosity of the first conductive material, a content of the second conductive material contained in the second anode mixture layer is greater than a content of the second conductive material contained in the first anode mixture layer, wherein the second anode mixture layer is disposed on an outermost surface of the multilayer anode, wherein a thickness of the second anode mixture layer is 50 to 80% of a total thickness of the first and second anode mixture layers, and wherein a content of the second conductive material contained in the second anode mixture layer is more than 0.5 wt % to less than 5 wt % of a total active material content of the first and second anode mixture layers.

8. The multilayer anode of claim 7, wherein the porosity of the first conductive material is 0 to 30%, and the porosity of the second conductive material is 50 to 90%.

9. The multilayer anode of claim 8, wherein an average particle diameter of the second conductive material is greater than an average particle diameter of the first conductive material.

10. The multilayer anode of claim 9, wherein the average particle diameter of the first conductive material is 0.01 to 0.5 μm, and the average particle diameter of the second conductive material is 0.5 to 5 μm.

11. The multilayer anode of claim 9, wherein an average pore diameter of the first conductive material is 0 to 0.01 μm, and an average pore diameter of the second conductive material is 0.01 to 0.5 μm.

12. The multilayer anode of claim 7, wherein the first and second conductive materials are selected from carbon black, acetylene black, furnace black, ketjen black, carbon nanotubes, artificial graphite, natural graphite, silver, aluminum and copper.

13. A lithium secondary battery comprising the multilayer anode according to claim 1.

14. A lithium secondary battery comprising the multilayer anode according to claim 7.

* * * * *